July 7, 1931.  G. M. CLASS  1,813,484
TURRET CLAMPING DEVICE
Filed Dec. 16, 1929  5 Sheets-Sheet 2
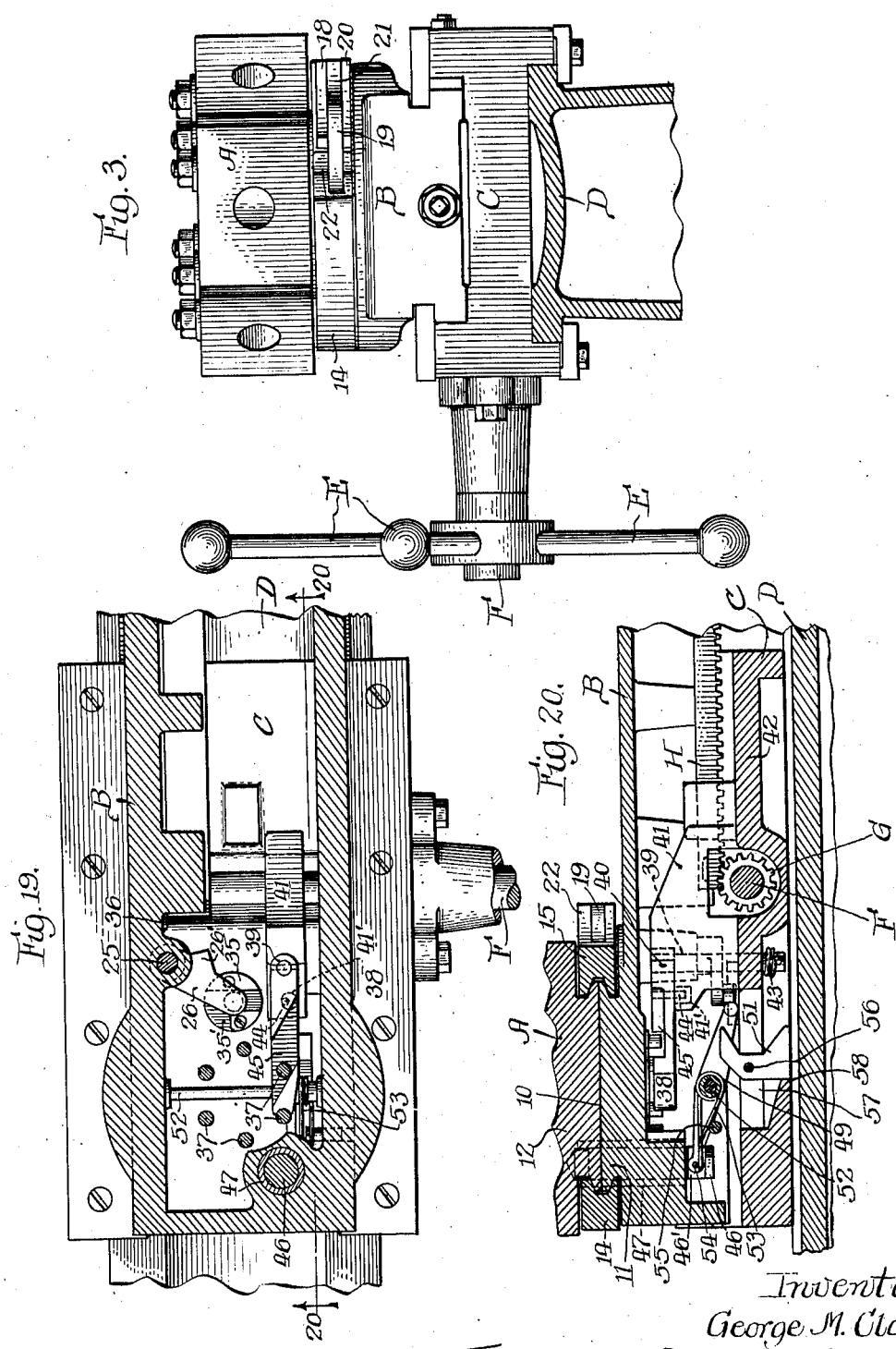
Inventor:
George M. Class
By Fisher, Clapp, Soans & Pond, Attys.

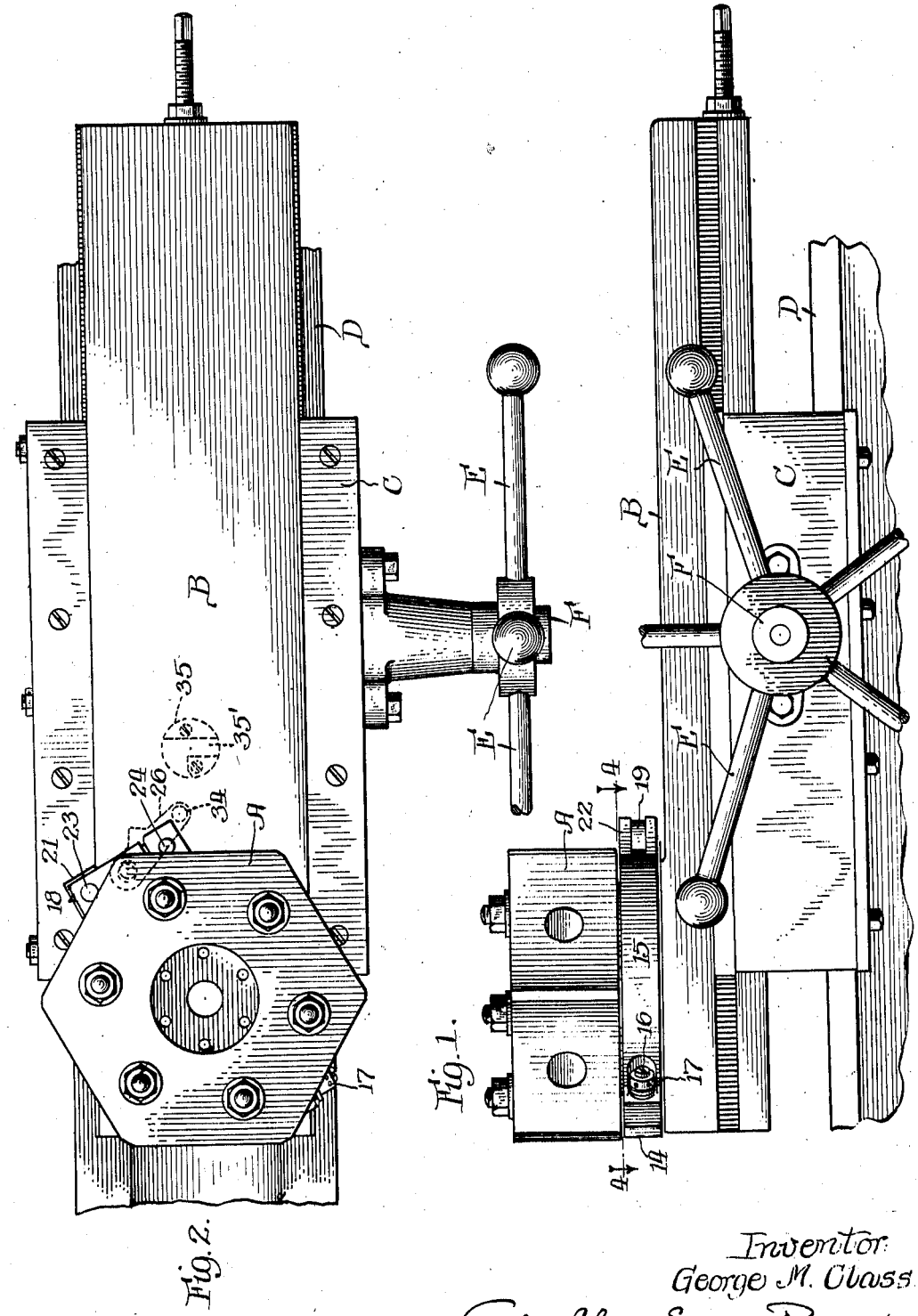

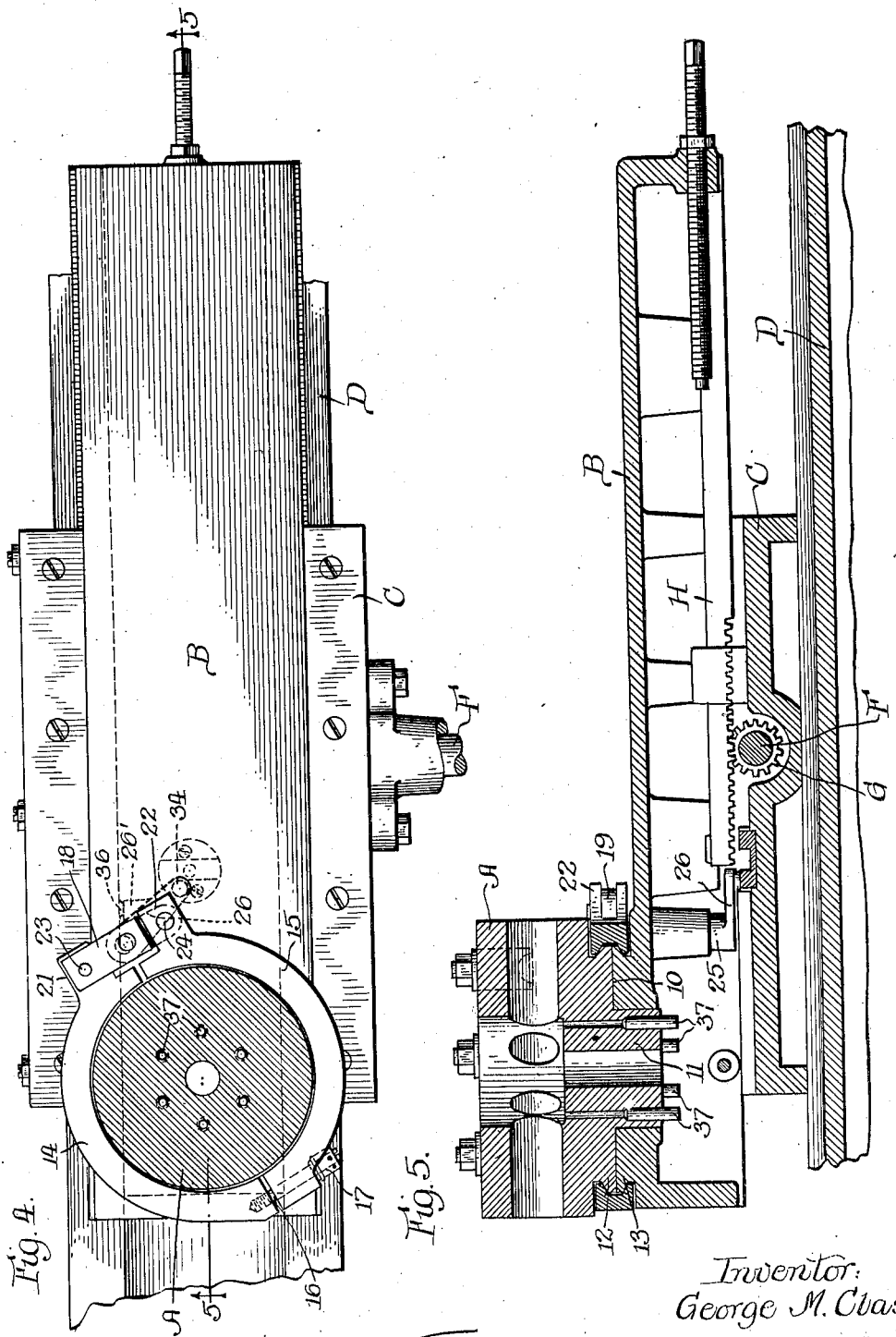

July 7, 1931.  G. M. CLASS  1,813,484
TURRET CLAMPING DEVICE
Filed Dec. 16, 1929  5 Sheets-Sheet 4
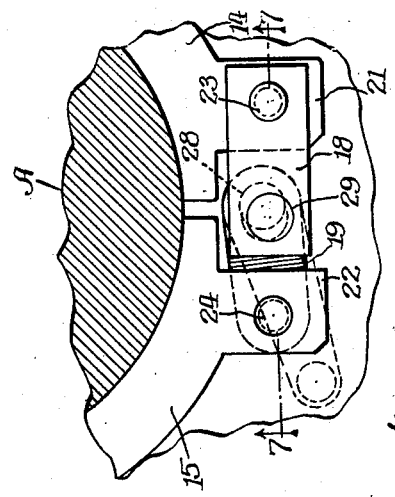
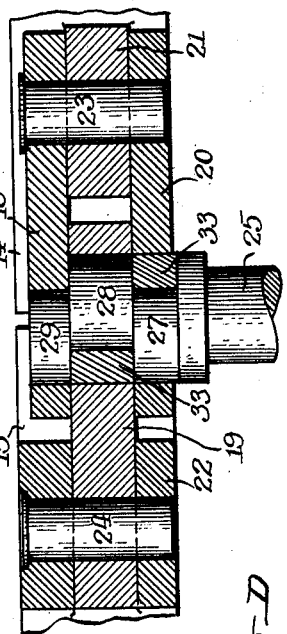
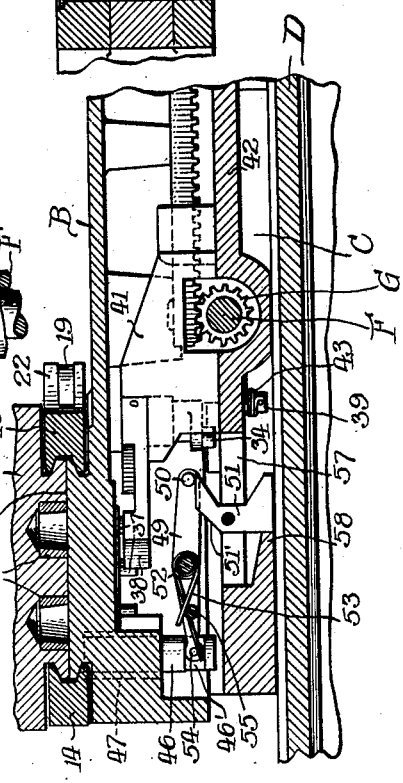
Inventor:
George M. Class,
By Fisher, Clapp, Soans & Pond, Attys.

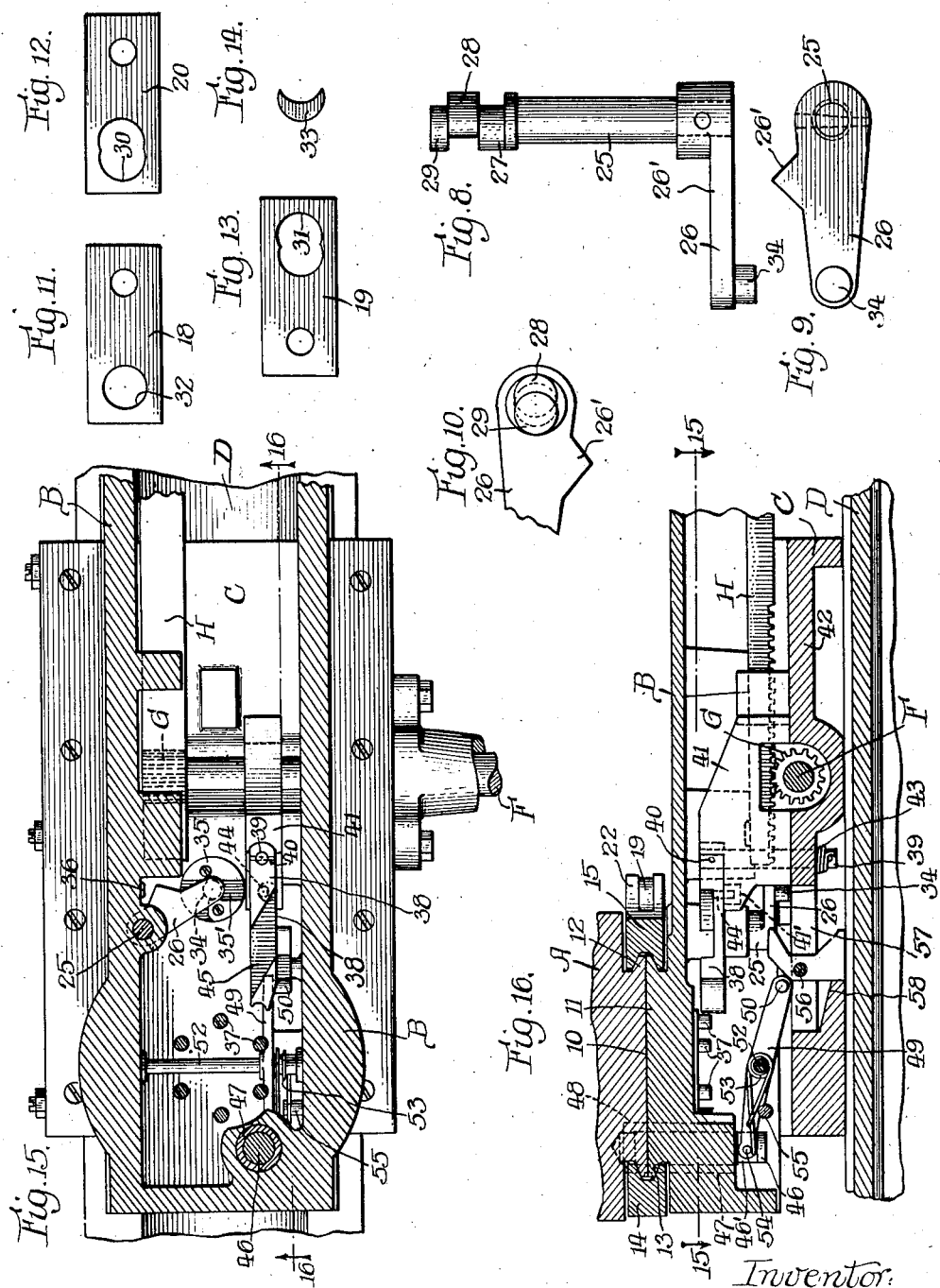

Patented July 7, 1931

1,813,484

UNITED STATES PATENT OFFICE

GEORGE M. CLASS, OF MADISON, WISCONSIN, ASSIGNOR TO GISHOLT MACHINE COMPANY, OF MADISON, WISCONSIN, A CORPORATION OF WISCONSIN

TURRET CLAMPING DEVICE

Application filed December 16, 1929. Serial No. 414,262.

The following described invention relates to the art of turret lathes, and its general purpose is to provide an improved and automatic mechanism for rigidly clamping the turret on the slide while the cutting tools held in the turret are in operation, and for unclamping the turret while the latter is being indexed to a succeeding operative position.

So far as I am aware, the means heretofore employed for clamping the turret on the slide has usually been manually operated. One means heretofore employed for this purpose consists of a vertical stud extending upwardly through an opening in the center of the turret and secured at its lower end in the body of the slide, a collar encircling the upper end of the stud having a bearing on the top of the turret, and a nut on the threaded upper end of the stud actuated by a hand crank thereon, forcing the collar down on the turret thus clamping the turret to its seat on the slide. Still another known clamping device comprises a split clamping ring formed with a channeled and tapered inner periphery which embraces oppositely tapered flanges on the turret seat and turret, with a manually operated means for drawing the ends of the ring together to thus grip and clamp the turret on its seat.

In the use of such manually operated gripping devices, after the turning or boring operation has been completed with the turret in one position, the latter is manually unclamped by the operator, then indexed to the next position, and then again manually clamped in its new position ready for the next turning or boring operation. This manual clamping and unclamping of the turret, of course, involves considerable time and labor, and one object of the present invention is to provide, in combination with a turret clamping member, means whereby said member may be automatically actuated to unclamping position by and during the backward traverse of the turret slide, and automatically actuated to the turret clamping position by and during the advance or forward movement of the slide.

Another object is to provide an automatic turret clamping and unclamping mechanism of the character above outlined that shall be suitably coordinated and synchronized with automatic means for first unlocking the turret, automatic means for then indexing the turret to its next position and automatic means for then relocking the turret in indexed position.

One practical embodiment of the present invention is illustrated in the accompanying drawings, in which—

Fig. 1 is a side elevation, Fig. 2 is a top plan, and Fig. 3 is an end elevation, in section through the lathe bed, of a turret, turret slide and saddle having my present improvement applied thereto.

Fig. 4 is a top plan, in horizontal section through the turret on the line 4—4 of Fig. 1.

Fig. 5 is a vertical section on the median line 5—5 of Fig. 4.

Fig. 6 is a detail top plan view of the meeting ends of the split clamping ring, and the mechanism for contracting and expanding the latter.

Fig. 7 is an enlarged vertical section taken on the line 7—7 of Fig. 6.

Fig. 8 is a detail elevation of the actuating shaft of the clamping ring.

Fig. 9 is a bottom plan view of Fig. 8.

Fig. 10 is a top plan view of Fig. 8 with the crank arm broken off.

Figs. 11, 12 and 13 are detail plan views of links that are pivoted on the meeting ends of the split clamping ring.

Fig. 14 is a plan view of a crescent filler block employed in association with certain of the links and operating eccentrics to facilitate assembling.

Fig. 15 is a horizontal section through the turret slide taken on the line 15—15 of Fig. 16.

Fig. 16 is a vertical section taken on the line 16—16 of Fig. 15.

Fig. 17 is a view similar to Fig. 15, but showing a further retracted position of the turret and turret slide, wherein the clamping ring has been loosened and the indexing of the turret is about half completed.

Fig. 18 is a view similar to Fig. 16 taken on the line 18—18 of Fig. 17.

Fig. 19 is a vertical section similar to Figs. 15 and 17, showing a fully retracted position of the turret and turret slide, and one wherein the turret has been indexed to and locked in its new position.

Fig. 20 is a vertical section on the line 20—20 of Fig. 19.

Referring to the drawings, A designates as an entirety the turret, B the turret slide, C the saddle, and D the bed of the turret lathe. The turret slide B is given a longitudinal motion in the guideways in saddle C by hand levers E fast on a shaft F that is journalled in the saddle member and carries a pinion G (Fig. 5) that engages a longitudinal rack H attached to the underside of the slide B. The above described parts are all of old and well known construction.

Referring to Fig. 5, the slide B is formed with a turret seat 10 on which the bottom of the turret A rests, said seat being centrally apertured to form a bearing for the depending trunnion 11 of the turret. The bottom of the turret A and the seat 10 on the slide B are provided respectively with annular flanges 12 and 13, the outer sides of which are oppositely tapered to cooperate with a correspondingly tapered annular recess in a split clamping ring. This clamping ring comprises two substantially semi-circular sections 14 and 15, which are adjustably connected at one end by means of a stud 16 secured in section 14, and a nut 17 thereon. The hole in section 15 is a loose fit on the stud 16, so that a joint having a sufficient degree of flexibility to permit clamping and unclamping movements of the ring sections is provided.

Describing next the mechanism for drawing together and forcing apart the opposite ends of the ring sections 14 and 15, this mechanism comprises a pair of links 18 and 20, which are located on opposite sides of an ear 21 on the ring section 14, and a third link 19, which fits in a slotted ear 22 on the ring section 15. The links 18 and 20 are swiveled on a pin 23 mounted in the ear 21; and link 19 is swiveled on a like pin 24 mounted in the forked ear 22. Suitable openings in the other ends of the links meet at a position substantially midway between the ears 21 and 22 and are adapted to receive opposed eccentrics on the upper end of a shaft 25. Detailed views of this shaft on an enlarged scale are shown in Figs. 8, 9 and 10, and detailed plan views of the links 18, 19 and 20 are shown in Figs. 11, 13 and 12 respectively.

The shaft 25 is provided on its lower end with a crank 26, and at its upper end with three eccentrics 27, 28 and 29 that are preferably made integral with the shaft 25. These eccentrics occupy and cooperate with openings 30, 31 and 32 in links 20, 19 and 18 respectively, to move the ears 21 and 22 toward and from each other. The opening 30 in link 20 encircles the lower cam 27. This opening is elongated, as shown in Fig. 12, so that it will clear the cam 28 in passing over the same to its position on the cam 27. A crescent-shaped filled 33, shown in detail in Fig. 14 is put in place while assembling and is so formed as to completely fill the elongated portion of the opening 30. The opening 31 in link 19 is similarly elongated so that it will clear the cam 29 in passing over the latter to its position on cam 28, and a similar filler piece 33 is put in place in assembling to fill the elongated portion of the opening 31. The opening 32 in link 18 is circular and encircles the upper cam 29.

It will be seen that by turning the shaft 25 through the agency of the crank arm 26, the cams will, through the medium of the cooperating links, act to compress or open the clamping ring and thus grip or release the turret, depending on which way the shaft is turned.

Referring next to the means for automatically turning the shaft 25 during the backward and forward movements of the turret slide and turret, said shaft is journaled in a vertical bore in the body of the turret slide B, as clearly shown in Figs. 15, 17 and 19, and the crank arm 26 is provided with a laterally projecting lug 26', and on its free end with a depending pin 34 which, during the receding movement of the slide B, enters a transverse cam groove 35' in a cylindrical steel block 35 which is attached to the horizontal surface of the web portion of the saddle member C; it being observed that the end of the cam groove 35' nearest the shaft 25 is widened to permit the entrance and exit of the pin 34 during the movement of the slide. The lateral lug 26' on the crank arm abuts against a limiting stop 36 when the arm 26 has been swung to the ring clamping position shown in Fig. 4, in which position the opposed eccentrics have been carried slightly past the dead center, as shown more clearly in Fig. 6, the limiting stop 36 preventing further swing of the arm 26 beyond that position.

The turret clamping and unclamping mechanism last described is preferably employed in association with and in suitably coordinated and synchronized relation to a turret indexing mechanism and a turret locking mechanism; and before describing the complete operation, I will briefly describe the turret indexing and locking mechanisms herein shown, no claim, however, being made to these mechanisms per se.

Referring first to the indexing mechanism, the turret trunnion 11 is provided with a circular group of equally spaced depending studs 37, which are rigidly secured by force fits in suitable holes in the trunnion. Rotation is given to the turret by means of a pawl 38 which engages one of the studs 37 each time the slide member travels backward from the work. This pawl 38 is mounted on a vertical shaft 39, being secured thereto by means of a key pin 40. This shaft 39 is journaled in a lug portion 41 which is part of the saddle casting, and projects upwardly from the horizontal web portion 42 thereof. The lower projecting end of shaft 39 is encircled by a coil spring 43 which tends to hold the pawl 38 in operative position, shown in Figs. 15, 17 and 19. A stop pin 44 projecting from the under side of the pawl enters a clearance hole or depression 41' in the lug 41, and is so located that when the pawl 38 is in operative position, the pin 44 rests against the wall of said hole and acts as a stop against the pressure of the spring 43. The engaging end of the pawl 38 is concaved to fit the cylindrical surface of the studs 37, and the pawl is formed with an oblique groove 45 to form a clearance space for the pin 37 behind the one being engaged relatively to the direction of turret rotation, as clearly seen in Figs. 19 and 20.

Briefly describing the turret locking and unlocking mechanism herein shown, the exact position of the turret for each working position is determined by a locking pin 46 that is slidably fitted in a bushing 47 tightly fitted in a vertical bore in the turret slide B. The upper end of the pin is slightly tapered to fit correspondingly tapered holes in bushings 48 which are fitted in the turret A. In number these bushings correspond to the number of working faces on the turret, and they are arranged equally spaced in a circle to register with the locking pin 46 when the turret is turned to any of the working positions thereof. The locking pin serves to positively locate the turret in the working positions, while the clamping ring above described serves to grip the turret firmly in these positions against the pressure of the cutting tools. The locking pin 46 is withdrawn from the bushing 48 at the proper time by means of a lever 49, one end of which is formed with a cylindrical portion engaging a transverse slot 46' in the lower end of the locking pin, the other end of the lever being equipped with a lateral cylindrical stud 50 which is adapted to engage the inclined face 51' of a pivoted cam 51 while the slide is receding from the work. The lever 49 is mounted on a shaft 52 which is journaled at its ends in the slide member B, as clearly shown in Figs. 15, 17 and 19. The end of the lever 49 which engages the locking pin 46 is urged upwardly by a helical spring 53, one end of which engages a lateral stud 54 on the lever, and the other end of which engages a stud 55 secured in the slide member, as clearly shown in Figs. 16, 18 and 20. The cam 51 is pivoted on a pin 56, and swings in a slot 57 in the web portion 42 of the saddle member C. The lower portion of the cam 51 is enlarged for the purpose of adding weight to cause it to normally stand in the operative position shown in Figs. 16, 18 and 20, with its lower end contacting with a projecting lug 58 on the saddle member C which serves as a stop to hold the cam in the proper position.

Briefly describing the operation, Figs. 1 and 2 show the turret slide and turret in working position, with the turret locked and clamped on the slide, in which position it will be seen that the pin 34 on the crank arm 26 has passed out of and beyond the widened entrance end of the cam groove 35' of the block 35. As the slide begins its backward movement, in traveling from the position shown in Figs. 1 and 2 to that shown in Figs. 4 and 5, the pin 34 on the crank arm 26 has entered the wide end of the groove 35'. In traveling from the position of Figs. 4 and 5 to that of Figs. 15 and 16, the pin 34 has struck and moved part way down the rear wall of the groove 35', and this has caused the arm 26 and shaft 25 to begin a swinging movement in a clockwise direction, actuating the eccentrics and links in a direction to expand the clamping ring. The turret is still locked to the slide by the locking pin 46, as will be seen in Fig. 16, and the indexing mechanism has not yet begun to operate as will be seen by Fig. 15. As the slide continues its backward movement from the position shown in Figs. 15 and 16 to that shown in Figs. 17 and 18, the pin 50 on the lever 49 has ridden up the cam 51, thus retracting the locking pin 46, and one of the turret pins 37 has struck the free end of the pawl 38, and the turret has been indexed substantially half way to its new working position. During this same portion of the back travel of the slide, the arm 26 has been swung further to a position wherein the grip of the clamping ring on the turret has been released, thus permitting the turret to be freely turned by the indexing mechanism.

During the remainder of the retreating movement of the slide, from the position shown in Figs. 17 and 18 to that shown in Figs. 19 and 20, the indexing of the turret is completed, the pin 50 has fallen off and behind the nose of the cam 51 (Fig. 20) permitting the locking pin to be thrown upwardly by spring 53, and the arm 26 has been swung to the limit of its unclamping movement.

The turret at this point has been indexed and relocked in its new position. During the subsequent advance travel of the slide and turret, the pin 50 idly rocks the cam 51 in passing to the other side of the latter, without retracting the turret locking pin, the trunnion pin 37 behind the pin that has been engaged by the pawl has entered the oblique slot 45 of the pawl (Fig. 19) and, on the advance movement of the slide, simply cams the pawl laterally out of the way against the tension of the spring 43 (which promptly returns the pawl to working position), and the arm 26 and shaft 25 are swung counter-clockwise back to the ring clamping position shown in Fig. 4, wherein the lateral lug 26′ on the arm 26 has struck the limiting stop 36, just as the eccentrics have snapped past the dead center, so as to prevent any further movement of the arm and lock the ring in clamping position.

In some types of turret lathe the saddle C is omitted, and the turret slide or carriage B is mounted directly on the bed D. The present invention is manifestly equally applicable to lathes of this type, in which case the bed becomes the saddle and has the block 35, pawl 38, and cam 51 mounted thereon, and the term "saddle" as used herein is intended to cover such a construction, wherein the bed of the lathe forms the saddle.

From the foregoing it will be seen that my invention provides an entirely automatic means for gripping and unclamping the turret during the receding and advancing movements, respectively, of the turret slide, without requiring any attention on the part of the operator, and this mechanism is properly coordinated and synchonized with automatic turret indexing and locking mechanisms. And while I have illustrated and described a simple and practical automatic turret gripping and unclamping mechanism which in service has been found to function efficiently and satisfactorily, I do not limit the invention to the specific mechanism herein presented, but reserve all such variations, modifications and mechanical equivalents as fall within the spirit and purview of the claims.

I claim:

1. The combination of a saddle, a turret slide mounted on said saddle having a turret seat formed with a tapered flange, a turret rotatable on said seat and formed with an oppositely tapered flange registering with the flange of said seat, a split clamping ring embracing said flanges, apertured links pivotally connected to the opposed ends of said ring, a shaft having opposed eccentrics on its upper end engaged with the apertures of said links and a crank arm on its lower end, a fixed cam on said saddle cooperating with said crank arm to turn said shaft in a direction to expand said clamping ring during back traverse of said slide and to turn said shaft in a direction to tighten said ring during forward traverse of said slide, said eccentrics being so positioned on said shaft as to pass the dead center position in the fully locked position of said clamping ring, and a stop on said saddle cooperating with said arm to arrest further turning movement of said shaft after said eccentrics have passed the dead center position.

2. The combination of a saddle, a turret slide mounted on said saddle, a turret rotatable on said slide, means for clamping said turret on said slide, cooperating means mounted on said slide and saddle motivated by said slide operating to loosen said clamping means during back traverse of said slide and to tighten said clamping means during forward traverse of said slide, and other cooperating means on said turret and saddle motivated by said slide operating to automatically index said turret after said clamping means has been loosened.

3. The combination of a saddle, a turret slide mounted on said saddle having a turret seat formed with a tapered flange, a turret rotatable on said seat and formed with an oppositely tapered flange registering with the flange of said seat, a split clamping ring embracing said flanges, cooperating means mounted on said slide and saddle motivated by said slide operating to expand said clamping ring during back traverse of said slide and to tighten said clamping ring during forward traverse of said slide, and other cooperating means on said turret and saddle motivated by said slide operating to automatically index said turret after said clamping ring has been expanded.

4. The combination of a saddle, a turret slide mounted on said saddle, a locking pin slidably mounted in said slide, a turret rotatable on said slide and formed with locking recesses in its under side cooperating with said locking pin, means for clamping said turret on said slide, cooperating means on said saddle and slide motivated by the latter functioning to retract said locking pin during back traverse of said slide, other cooperating means on said turret and saddle motivated by said slide operating to automatically index said turret after said locking pin has been retracted; and other cooperating means on said slide and saddle motivated by said slide operating to loosen said clamping means during back traverse of said slide and to tighten said clamping means during forward traverse of said slide.

5. The combination of a saddle, a turret slide mounted on said saddle having a turret seat formed with a tapered flange, a locking pin slidably mounted in said seat, a turret rotatable on said seat and formed with an oppositely tapered flange registering with the flange of said seat and with locking recesses in its under side cooperating with said locking pin, a split clamping ring embracing said flanges, cooperating means on said saddle and slide motivated by the latter functioning to retract said locking pin during back traverse of said slide, other cooperating means on said turret and saddle motivated by said slide operating to automatically index said turret after said locking pin has been retracted, and other cooperating means on said slide and saddle motivated by said slide operating to expand said clamping ring during back traverse of said slide and to tighten said clamping ring during forward traverse of said slide.

GEORGE M. CLASS.